(12) United States Patent
Gukal et al.

(10) Patent No.: US 7,747,578 B2
(45) Date of Patent: Jun. 29, 2010

(54) REDUCING DATABASE FRAGMENTATION

(75) Inventors: Sreenivas Gukal, Sammamish, WA (US); Gang He, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/716,159

(22) Filed: Mar. 9, 2007

(65) Prior Publication Data

US 2008/0222221 A1    Sep. 11, 2008

(51) Int. Cl.
   *G06F 17/30* (2006.01)
(52) U.S. Cl. .................................. 707/661; 711/171
(58) Field of Classification Search .............. 707/104.1, 707/204–205; 711/171
   See application file for complete search history.

(56) References Cited

U.S. PATENT DOCUMENTS

| | | | |
|---|---|---|---|
| 5,808,821 A | 9/1998 | Davy | |
| 5,822,749 A | 10/1998 | Agarwal | |
| 6,477,535 B1 | 11/2002 | Mirzadeh | |
| 6,591,269 B1 | 7/2003 | Ponnekanti | |
| 6,757,804 B2 | 6/2004 | Jochemsen et al. | |
| 6,965,899 B1 | 11/2005 | Subramaniam et al. | |
| 2005/0086195 A1 | 4/2005 | Tan et al. | |
| 2006/0236069 A1 | 10/2006 | Kalach et al. | |
| 2007/0022148 A1 | 1/2007 | Akers et al. | |
| 2008/0162830 A1* | 7/2008 | Marathe et al. ............. 711/154 |

OTHER PUBLICATIONS

Deschler, et al., "B+ Retake: Sustaining High Volume Inserts into Large Data Pages", Date: Feb. 2001, http://citeseer.ist.psu.edu/cache/papers/cs/20733/http:zSzzSzdavis.wpi.eduzSzdsrgzSzTECH-REPSzSzTECH01-01-rbtree.pdf/deschler01retake.pdf.

Srinivasan, et al., "Oracle8i Index-Organized Table and its Application to New Domains", Date: 2000, http://www.vldb.org/conf/2000/P285.pdf.

Sears, et al., "Fragmentation in Large Object Repositories Experience Paper", Date: Jan. 7-10, 2007, http://arxiv.org/pdf/cs.DB/0612111.

* cited by examiner

*Primary Examiner*—Debbie Le

(57) ABSTRACT

Reducing database fragmentation is disclosed. One embodiment includes determining whether the building of an index of data that is to be stored in a database has been initiated and determining whether the size of a sub-range of the index exceeds a predetermined size. A block of data storage space is pre-allocated contiguous to a block of data storage space allocated for the sub-range to accommodate subsequent inserts of data into the sub-range, if it is determined that the sub-range exceeds the predetermined size.

20 Claims, 11 Drawing Sheets

|         | Column 1 | Column 2 | Column 3 |
|---------|----------|----------|----------|
| Row 1   |          |          |          |
| Row 2   |          |          |          |
| Row 3   |          |          |          |

Figure 1A
(Prior Art)

|  | K1 | K2 |  |
|------|----|----|------------------|
| Row 1 |  |  |  |
| Row 2 | X |  |  |
| Row 3 | X |  |  |
|  | X |  | End of Sub-Range |

Location of the Patterned Insert In the Table

Figure 2D

REDUCING DATABASE FRAGMENTATION

BACKGROUND

Data warehouses are repositories of all or parts of the data that an organization's various business systems collect. Data warehouses can include databases which can be used to maintain a collection of records or other information such that they can be easily accessed, updated and managed. The contents of such databases are many times organized into tables such as is shown in FIG. 1A that organize data by columns and rows.

Accessing information from databases can involve sequential scans over database indexes to tables. Database indexes specify the logical order of table contents. FIG. 1B shows one type of commonly used index called a B+ tree. A B+ tree can be constituted of a plurality of levels of indexing information. FIG. 1B shows a B+ tree that has internal and leaf levels. As shown in FIG. 1B, each level of the B+ tree can correspond to a set of linked pages (ranges of values from the table) which store rows of data in sorted key order. A sequential scan of a range of key values in a B+ index involves reading through a set of logically contiguous pages of data.

At each level of the B+ tree, the key order defines the logical order of the pages through a linkage system. However, the physical order of the pages in a file on disk (the location or offset of the pages in the underlying memory files) may or may not match the logical order of the pages as defined by the B+ tree. For example, although pages 100 and 30 may be logically adjacent and linked to each other based on key order defined in a B+ tree, they may reside at physical locations in memory that are widely separated.

Fragmentation refers to the degree of matching that exists between the physical and the logical orders of adjacent pages. There are two factors that decide fragmentation: (1) the degree of physical and logical order matching that exists between pages, and (2) page contiguity. When the physical order and the logical order of adjacent pages match, or are close, fragmentation is considered to be low. Conversely, where the physical and the logical order of adjacent pages are significantly different, fragmentation is considered to be high. Importantly, fragmentation detrimentally affects sequential index scan performance.

Fragmentation applies to any level in a B+ tree, including both leaf and internal levels. Internal level fragmentation can be consequential to a common performance enhancement feature for index scans in commercial database products called the read-ahead IO optimization which usually involves the scanning of internal nodes that point to leaf data pages.

Data warehouse queries generally involve the reading of large amounts of data (e.g., large numbers of leaf pages). Because of this, the data that is involved in such queries is generally stored on disks. Consequently, reading such data involves IOs that retrieve the data from disks. Such IOs generally involve disk head movements. Such disk head movement accounts for a significant portion of the cost associated with disk IOs. Importantly, the less disk head movement that is involved in an IO, the faster the IO can be completed.

It should be appreciated that if fragmentation is low, the disk head movement involved in executing a query can be minimal. This is because the disk head tends to move in one direction as the number of head movements back and forth over gaps of data not needed in the query is minimal as illustrated in FIG. 1C. Accordingly, where fragmentation is low, disk IOs can be completed quickly. However, when fragmentation is high, the disk head tends to move frequently back and forth over gaps in the process of locating data needed for the query as is illustrated in FIG. 1D. Accordingly, where fragmentation is high disk IOs complete more slowly. Furthermore, IO cost can mainly be attributed to disk head seek time. The less severe the fragmentation level of an index, the less time required for disk head seeks. Accordingly, IO completion time is better, and costs are reduced, when fragmentation is low.

Other benefits of low fragmentation include larger sized IOs. Larger sized IOs involve the reading of larger amounts of data. Larger sized IOs can reduce the number of total reads issued since data that is sought can be retrieved using fewer reads. Such a reduction in the number of total reads issued can reduce kernel overhead as kernel involvement is reduced.

A conventional approach to minimizing fragmentation involves pre-allocating physically contiguous pages to accommodate data contained in an index (both leaf and internal) at index build time. Because the size of an index is readily ascertainable at index build time, a block of contiguous pages that can accommodate data contained in the index can be pre-allocated for the index. However, since subsequent inserts of data are allocated pages on demand, the pages allocated for subsequent inserts can be separated from the originally allocated block of contiguous pages.

Conventional allocation systems receive requests for allocations from different concurrent users related to different indexes. Accordingly, page allocations for data inserts to a particular index typically can be separated by intervening page allocations for data inserts to other indexes. Moreover, page allocations for inserts of data to a particular index made after the index has been built can be from physical locations in the file that are widely separated from that of other pages allocated for the same index. Because such allocations do not maintain the contiguity of pages established when the original block of pages is allocated, index fragmentation is increased.

Conventional approaches such as the one discussed above are unsatisfactory as the detrimental affects of fragmentation on sequential index scan performance not adequately addressed thereby remains significant. In the above discussed approach when data inserts made after the index has been built reaches one percent of the rows that constitute an index, the sequential index scan performance is reduced by 27% due to fragmentation. It should be appreciated that this result is based on a specific test and the degradation of performance can vary for different cases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Databases experience fragmentation due to limited capabilities of database management systems in managing inserts of data into database indexes. One embodiment reduces database fragmentation by pre-allocating a block of data storage space to accommodate inserts of data to sub-ranges of an index that are made after an initial allocation of storage space for the sub-range is made. In one embodiment the pre-allocating is performed if it is determined that the size of the sub-range exceeds a predetermined size and that the building of the index has been initiated. Sequential scan performance is improved as a result of the reduced database fragmentation.

BRIEF DESCRIPTION OF THE DRAWINGS

The accompanying drawings, which are incorporated in and form a part of this specification, illustrate embodiments and, together with the description, serve to explain the principles of the embodiments:

FIG. 1A shows a conventional table such as is used in the organization of database data.

FIG. 2D shows the position in an index table that is occupied by an insert of data such as a data manipulation language (DML) insert appended to the end of a sub-range according to one embodiment.

The drawings referred to in this description should not be understood as being drawn to scale except if specifically noted.

DETAILED DESCRIPTION

Reference will now be made in detail to various embodiments, examples of which are illustrated in the accompanying drawings. While embodiments will be described herein, it will be understood that these descriptions are not intended to limit the disclosed subject matter to specific embodiments. On the contrary, the embodiments are intended to cover alternatives, modifications and equivalents, which may be included within the spirit and scope of the subject matter disclosed herein as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

As used herein, the term "data storage file" is intended to refer to physical data storage space such as on a hard disk where data from various indexes can be stored. The term "data page" is intended to refer to ranges of values from a table that can be allocated space in a data storage file. The term "sub-range" is intended to refer to a subcomponent of a database index/tree.

Exemplary Operating Environment of System for Reducing Database Fragmentation

Figure 1B:
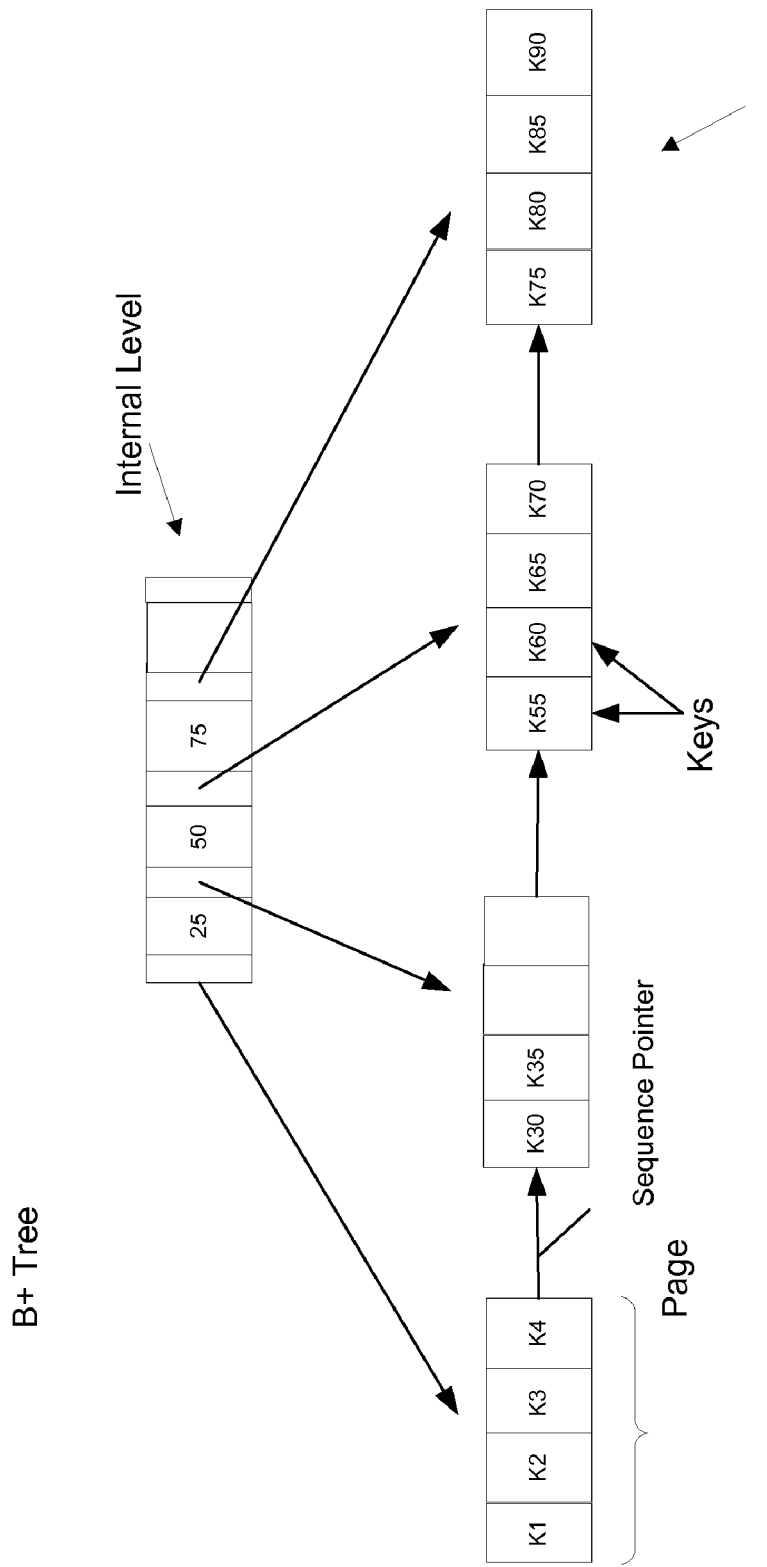
FIG. 1B shows one type of commonly used index called a B+tree.
Figure 1D:
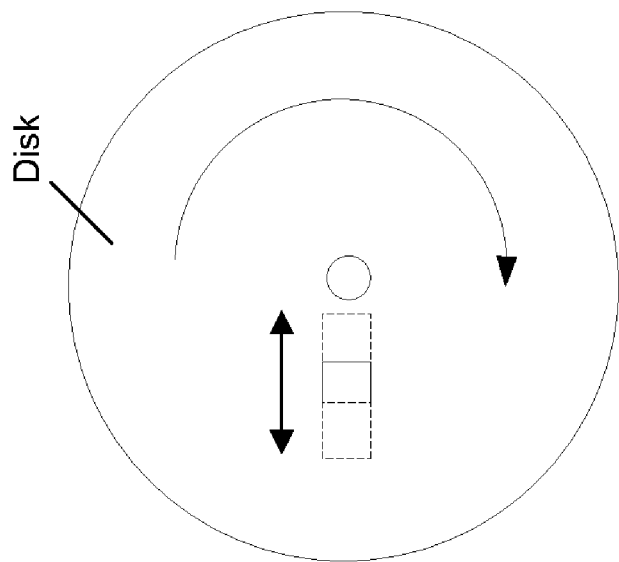
FIG. 1D illustrates the manner in which a disk head tends to move when fragmentation is severe.
Figure 1C:
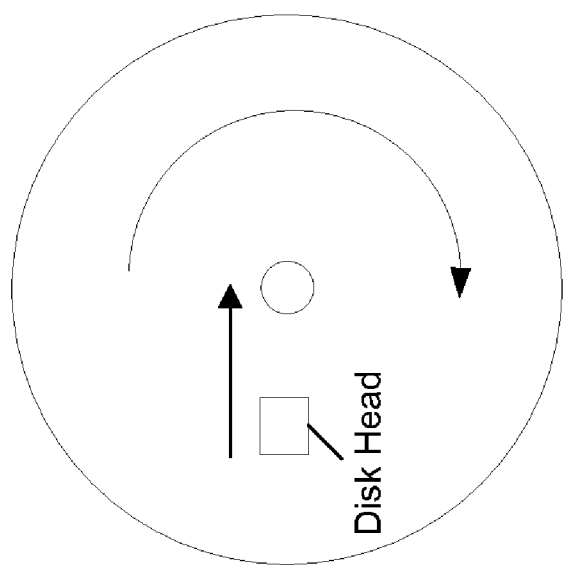
FIG. 1C illustrates the manner in which a disk head tends to move when fragmentation is slight.
Figure 2A:
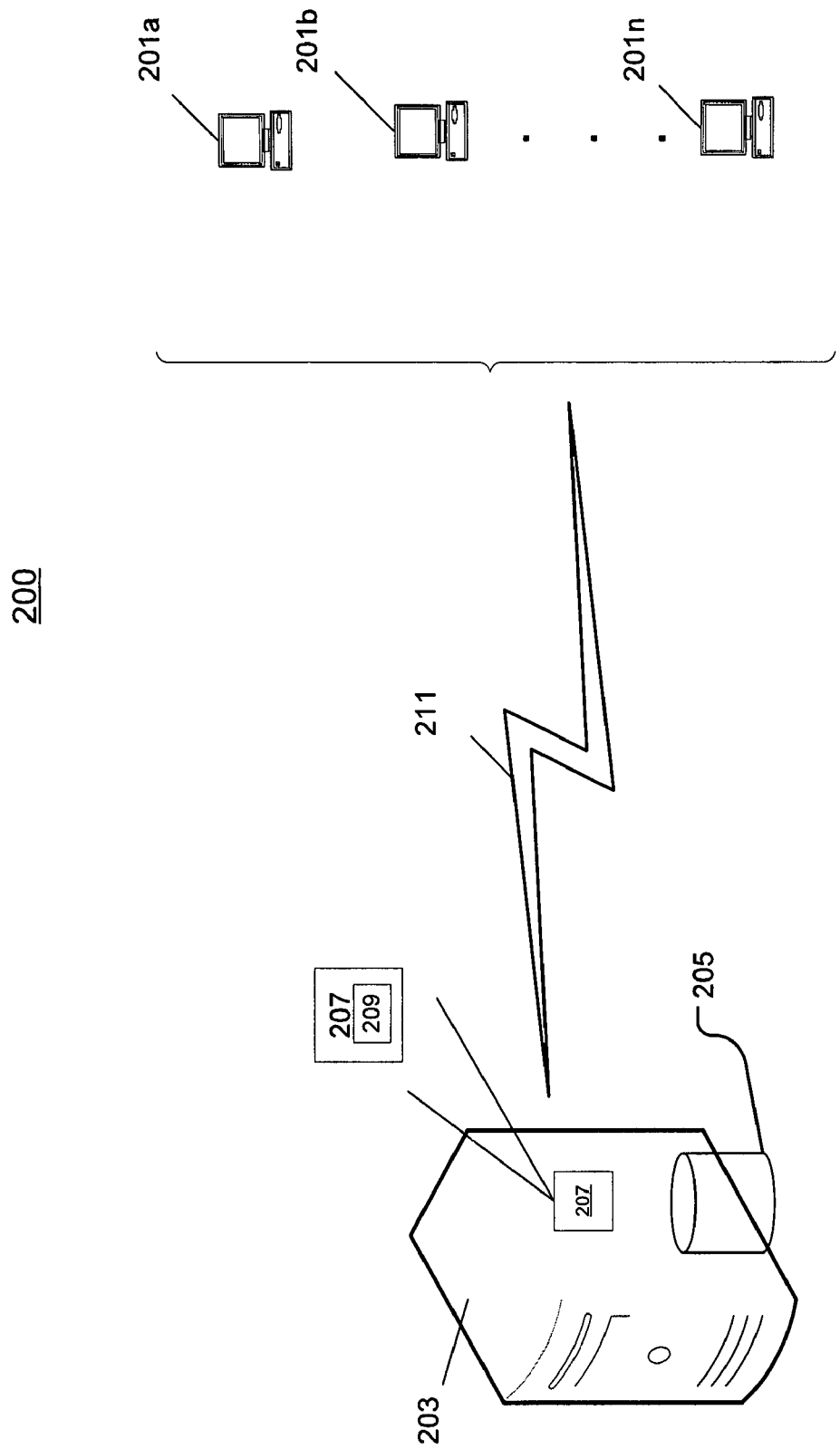
FIG. 2A shows an exemplary operating environment of a system for reducing database fragmentation according to one embodiment.

FIG. 2A shows an exemplary operating environment 200 of a system 209 for reducing database fragmentation according to one embodiment. System 209 improves sequential index scans by reducing database fragmentation that can detrimentally affect sequential index scans. In one embodiment, system 209 reduces database fragmentation by pre-allocating contiguous data storage space for inserts of data into an index made after an initial allocation of data storage space for the index. In FIG. 2A, operating environment 200 includes client computer systems 201a-201n, network server 203, database 205, database management system 207, system 209 for reducing database fragmentation and network link 211.

Referring to FIG. 2A, network server 203 services client computer systems 201a-201n and houses database 205. In one embodiment, network server 203 can be coupled to client computer systems 201a-201n through network link 211. Network link 211 can include either a wired or a wireless network. In one embodiment, network server 203 can include a mainframe computer. In other embodiments, network server 203 can include other types of computer systems.

Database 205 maintains a collection of information (e.g., records) that can be readily accessed, managed and updated. In one embodiment, the aforementioned collection of information can be organized into data pages that are logically related by an index. In one embodiment, database 205 can be accessed, managed and updated through queries issued via database management system 207. In one embodiment, these operations can involve the scanning of an index to the database.

In one embodiment, database 205 can reside on network server 203. In another embodiment, database 205 can reside at a location that is remote from network server 203. In one embodiment, database 205 can be housed on a mainframe computer server. In other embodiments, database 205 can be housed on one or more computers of a distributed workstation system or reside on a personal computer (not shown).

Database management system 207 can include a program application that manages database 205. In one embodiment, the managing of database 205 can involve the managing of database indexes (e.g., data inserts and deletions made thereto). In one embodiment, system 209 can be a part of database management system 207. In another embodiment, system 209 can be separate from but operate cooperatively with database management system 207.

Figure 2B:
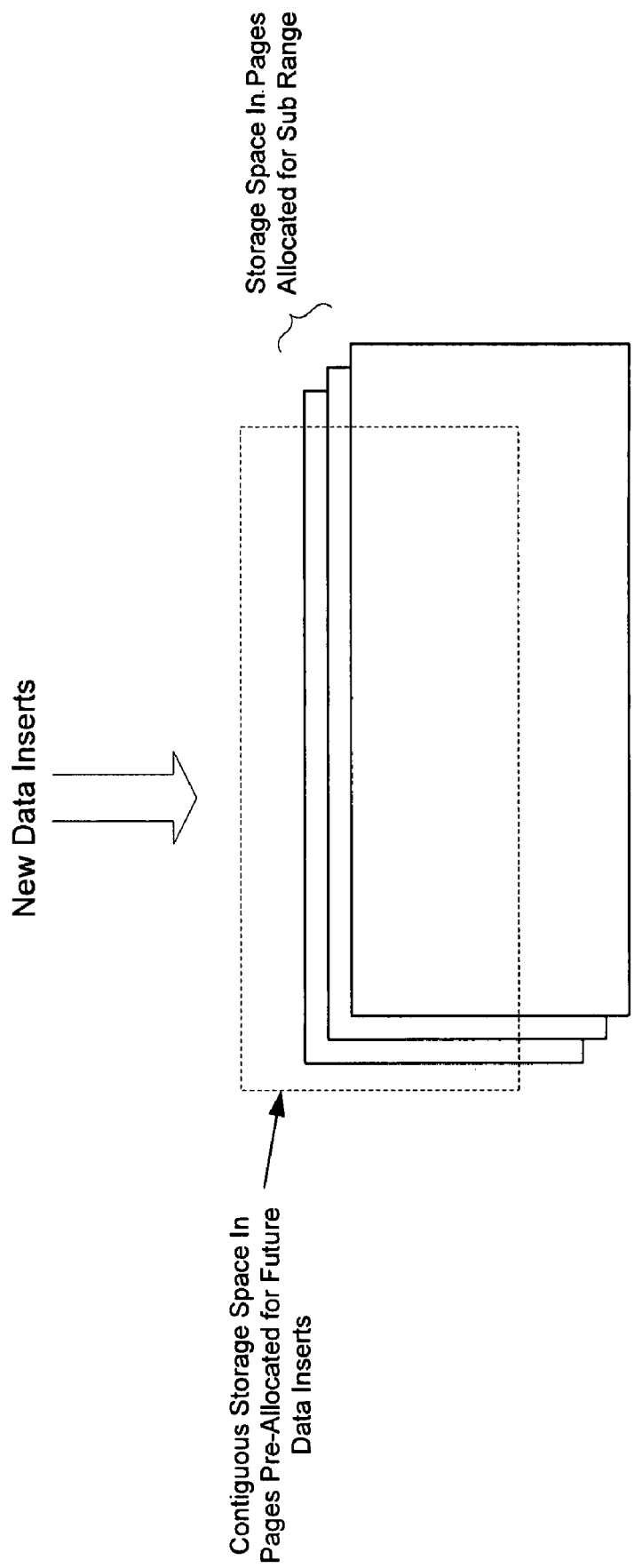
FIG. 2B illustrates the manner in which prospective inserts of data into a sub-range of an index are accommodated by a pre-allocated block of contiguous data storage space according to one embodiment.
Figure 2C:
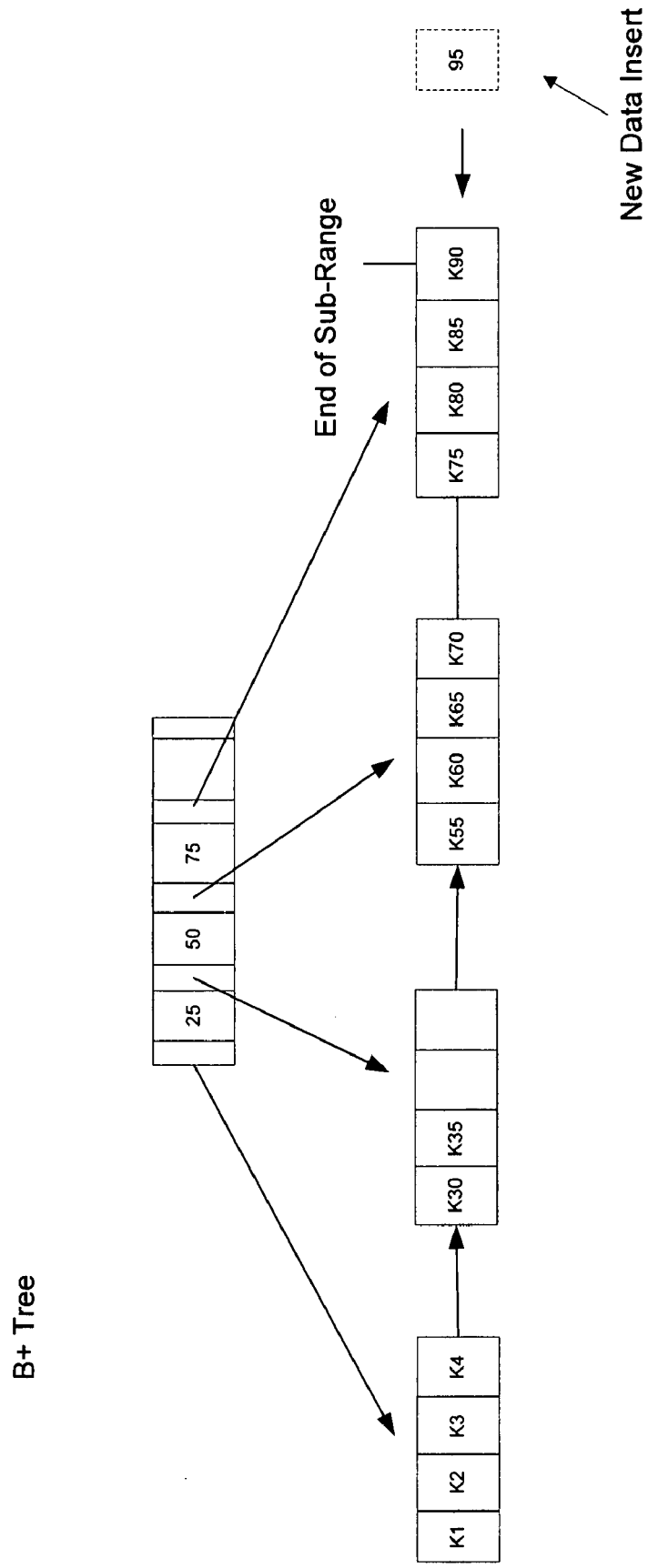
FIG. 2C illustrates the manner in which patterned inserts are appended to a sub-range of an index tree according to one embodiment.

As discussed above, system 209 operates to reduce database fragmentation. In one embodiment, as a part of its operations, system 209 directs the pre-allocation of a block of data storage space that is contiguous to data storage space already allocated for a sub-range of an index in order to accommodate subsequent inserts of data into the sub-range of the index as is illustrated in FIGS. 2B and 2C respectively. In one embodiment, this is done if the size of the sub-range is determined to exceed a predetermined value (the significance of sub-range size is discussed below). In one embodiment, the pre-allocated block of data storage space is used to accommodate inserts of data into the sub-range that are appended to the end of the sub-range. In one embodiment, a common type of data insert that is characterized by appends to the end of sub-ranges of indexes includes data manipulation language (DML) inserts.

FIG. 2D shows the position in an index table of an insert of data such as a data manipulation language (DML) insert, appended to the end of a sub-range. As mentioned above, a feature of patterned inserts to indexes such as DML inserts is that they are typically appended to the end of a sub-range. For example, referring to FIG. 2D, if a sub-range index has two key columns K1 and K2 (where K1 is the same for all values in the sub-range), when a DML insert is made to the sub-range, the K2 value of the new row formed by the DML insert is actually greater than that in any existing row sharing the same value for K1. Such DML inserts have the pattern that they append to the end of the sub-range with the same K1 value (see FIG. 2D). In one embodiment, providing a physically contiguous block of data storage space to take advantage of this feature of DML inserts ensures greater logical and physical contiguity of data pages because the logical contiguity of such data inserts is matched by the physical contiguity of the pre-allocated file storage space which these data inserts can be respectively placed into.

Referring again to FIG. 2A, system 209 reduces the fragmentation of data stored in a data storage file by ensuring the physical contiguity of pages of data stored in the data storage file that are logically contiguous. In one embodiment, the physical contiguity of pages of data subsequently inserted into a sub-range that are logically contiguous to pages of data already stored in the sub-range can be ensured because of the aforementioned pre-allocation of contiguous data storage space.

Because of this, contiguity of logically contiguous data pages in the data storage file can be maintained despite intervening or concurrent data inserts to the data storage file as can be made by other requesters of page allocations (users at client computers 201a-201n, computer programs etc.). These data inserts can involve other indexes that can request and receive data storage space allocations from the same data storage file.

In contrast to conventional systems, as discussed above, in one embodiment, a set of physically contiguous data pages are pre-allocated and recorded for new data inserts into the sub-range instead of having a single page randomly allocated at the time that new data inserts are presented for entry into the index. In one embodiment, when a new data insert is made, the first physical page in the pre-allocated set of data pages is used for the insert.

When the first physical data page is filled, subsequent data inserts into the sub-range are placed into the next data page from the set of pre-allocated data pages instead of having a random page allocated from the underlying data storage file. In one embodiment, when the entire pre-allocated set of data pages is filled with data inserts the process is repeated (another block of data pages is allocated for subsequent inserts). In this manner the physical contiguity of data pages in the sub-range is maintained and fragmentation is reduced which results in improved sequential scan performance.

At the time that the block of pre-allocated data pages is made, the exact number of subsequent inserts to be made may not be able to be determined. However, by providing a suitable ratio of sub-range size to pre-allocated block size, the worst case possibility of wasted space due to non use of pre-allocated data pages can be rendered insignificant.

In one embodiment, in order to ensure that space wasted is insignificant, the size (e.g., number of pages) of the sub-range can be large as compared with the size of the storage space pre-allocated for subsequent inserts. In one embodiment, the size of the sub-range can be greater than or equal to 8000 pages. In other embodiments, the size of the sub-range can be other sizes. In one embodiment, the number of contiguous data pages that can be pre-allocated for subsequent data inserts can equal 64 pages. In other embodiments, other numbers of contiguous data pages can be pre-allocated. In one embodiment, the pre-allocated block size can be determined automatically based on a determined size of the index.

The above discussed function of system 209 can maintain the physical contiguity of data pages in each sub-range of an index. This translates to a corresponding physical contiguity of data pages in the index as a whole. Importantly, because of this, sequential scans of the index are significantly improved.

Operation

FIG. 2D illustrates operations A-F that are performed as a part of a method for reducing database fragmentation according to one embodiment. The operations illustrated are exemplary of one embodiment and other embodiments can include operations not illustrated or can be implemented using operations other than the ones that are illustrated.

Referring to FIG. 2D, at A, such as through operation of database management system 207, the building of an index (including its sub-ranges) is initiated to logically relate pages of data to be stored in a database. At B, system 209 determines whether the aforementioned building of an index has been initiated. In one embodiment, system 209 can determine such through a retrieval of data from database management system 207. In another embodiment, system 209 can determine such from data received from database management system 207.

At C, system 209 determines whether the size of a sub-range of the index to be built exceeds a predetermined size. At build time, the size of a sub-range of the index (and the index) to be built is readily ascertainable, such as from database management system 207. At D, database management system 207 builds or completes the building of the index including the sub-range.

At E, system 209 directs the pre-allocation of a block of data storage space (contiguous data pages) to accommodate subsequent inserts of data into a sub-range of the index that has been built. In one embodiment, system 209 pre-allocates the block of data storage space if it is determined that the size of the sub-range exceeds a predetermined value.

Figure 2E:
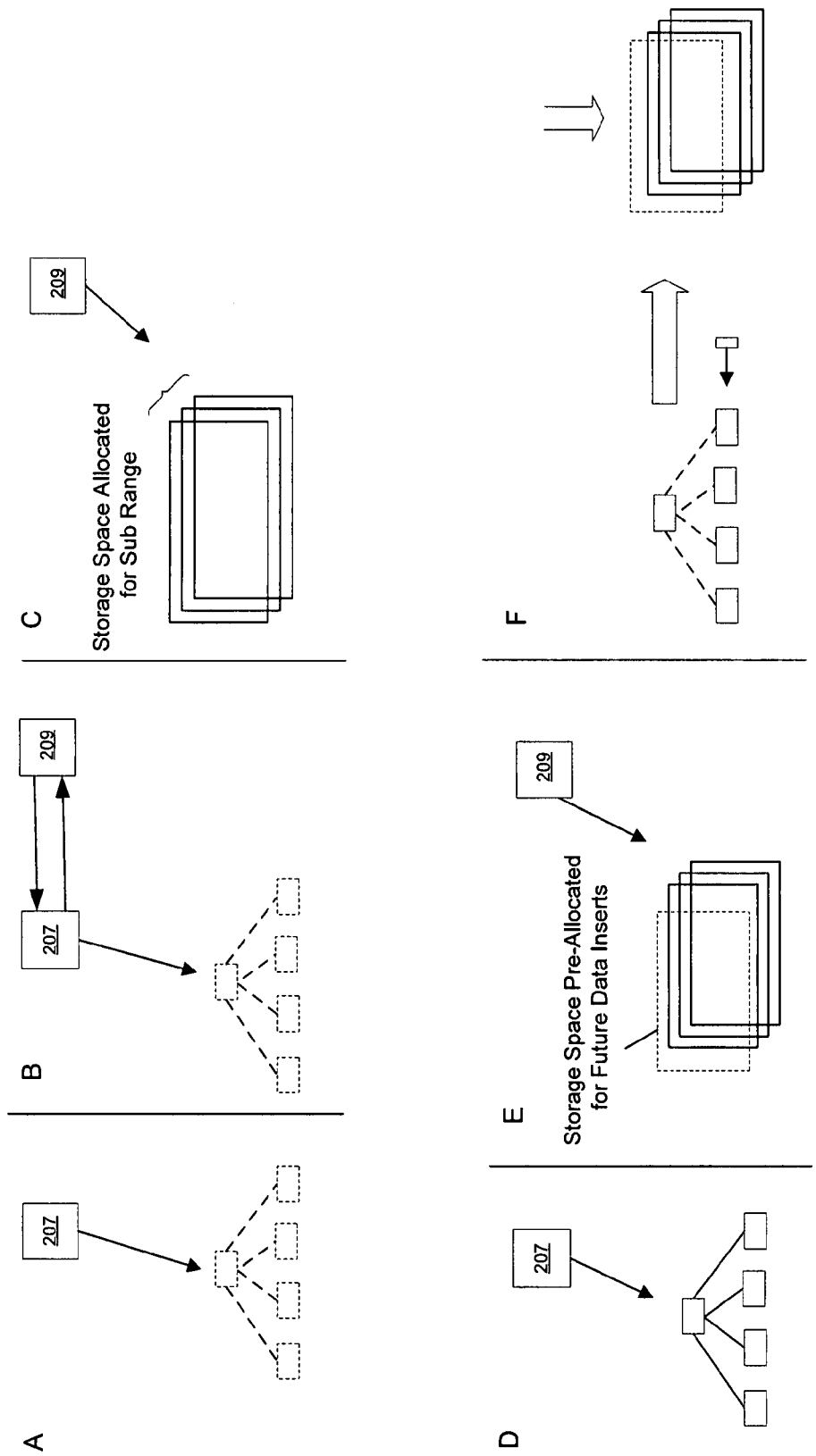
FIG. 2E illustrates operations that are performed as a part reducing database fragmentation according to one embodiment.

At F, when patterned inserts are made to the sub-range after the allocation of storage space corresponding to the initial index build, they are appended to the end of the sub-range. Furthermore, the data is placed into the contiguous block of storage space pre-allocated by system 209 (see F in FIG. 2E).

Figure 3:
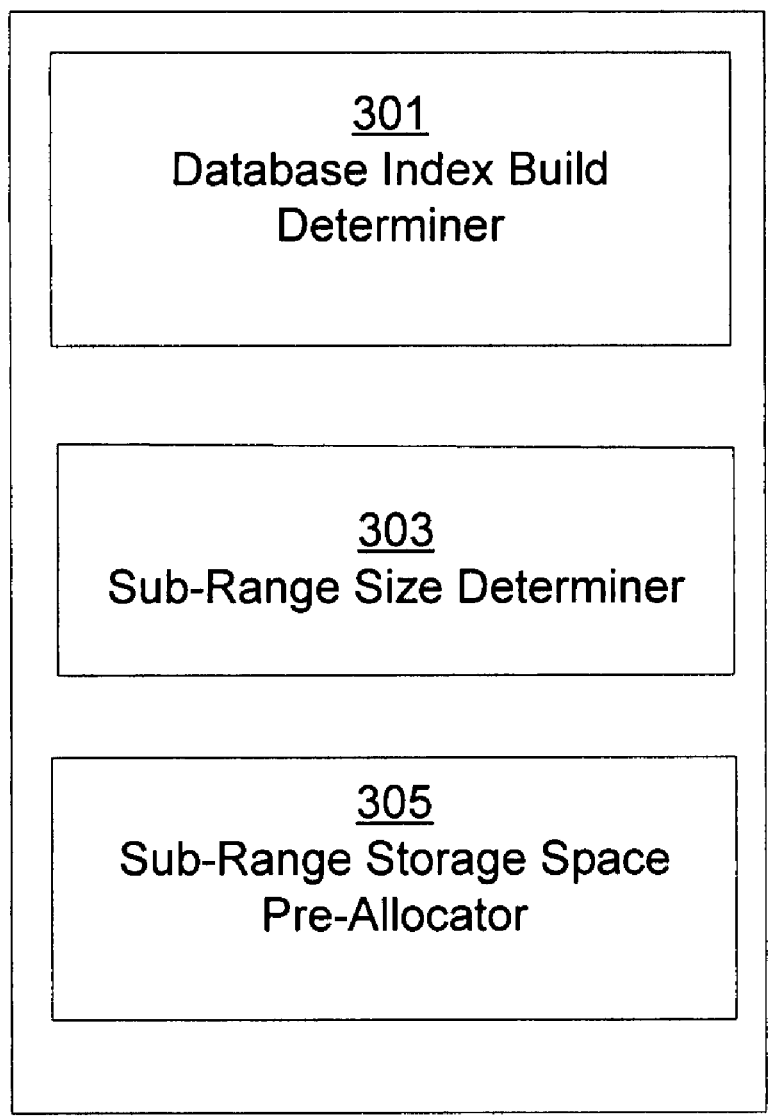
FIG. 3 shows components of a system for reducing database fragmentation according to one embodiment.

Components of System for Reducing Database Fragmentation According to Embodiments FIG. 3 shows components of a system 209 for reducing database fragmentation according to one embodiment. In the FIG. 3 embodiment, system 209 includes database index build determiner 301, sub-range size determiner 303 and sub-range storage space pre-allocator 305.

It should be appreciated that aforementioned components of system 209 can be implemented in hardware or software or in a combination of both. In one embodiment, components and operations of system 209 can be encompassed by components and operations of one or more computer programs (e.g., database management system 207 in FIG. 2A). In another embodiment, components and operations of system 209 can be separate from the aforementioned one or more computer programs but can operate cooperatively with components and operations thereof.

Referring to FIG. 3, database index build determiner 301 determines whether the building of a database index has been initiated. In one embodiment, data that indicates whether the building of a database index has been initiated can be retrieved by database index build determiner 301 from a database management system (e.g., 207 in FIG. 2A). In another embodiment, data that indicates whether the building of a database index has been initiated can be received by database index build determiner 301 from a database management system (e.g., 207 in FIG. 2A).

Sub-range size determiner 303 determines whether the size of a sub-range of the index exceeds a predetermined size. As discussed herein, at build time, the size of the sub-range to be built is readily ascertainable. In one embodiment, data that provides an indication of the size of the sub-range can be retrieved by sub-range size determiner 303 from a database management system (e.g., 207 in FIG. 2A). In another embodiment, data that provides an indication of the size of the sub-range can be received by sub-range size determiner 303 from a database management system (e.g., 207 in FIG. 2A).

Sub-range storage space pre-allocator 305 pre-allocates a block of data storage space in a data storage file to accommodate inserts of data into an sub-range made subsequent to the initial allocation of data storage space for the sub-range from the data storage file. In one embodiment sub-range storage space pre-allocator 305 can be prompted to pre-allocate the block of data storage space if sub-range size determiner 303 determines that the sub-range exceeds a predetermined size.

Figure 4:
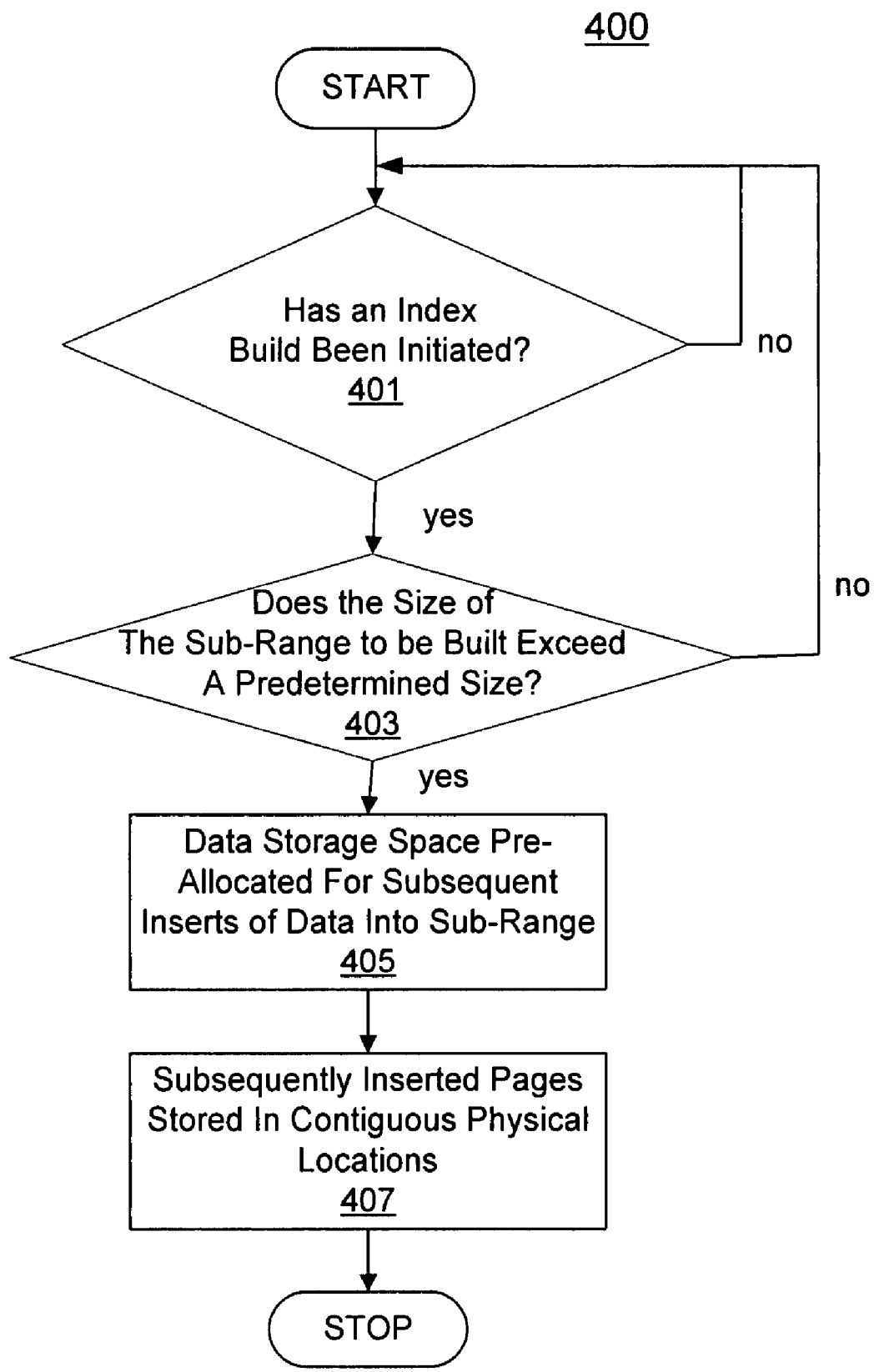
FIG. 4 shows a flowchart of the steps performed in a method for reducing database fragmentation according to one embodiment.

Exemplary Operations of Method for Reducing Database Fragmentation According to Embodiments FIG. 4 shows a flowchart 400 of the steps performed in a method for reducing database fragmentation according to one embodiment. The flowchart includes processes that, in one embodiment, can be carried out by processors and electrical components under the control of computer-readable and computer-executable instructions. Although specific steps are disclosed in the flowcharts, such steps are exemplary. Moreover, embodiments are well suited to performing various other steps or variations of the steps recited in the flowcharts. Within various embodiments, it should be appreciated that the steps of the flowcharts can be performed by software, by hardware or by a combination of both.

Referring to FIG. 4, at step 401, it is determined whether the building of a database index has been initiated. In one embodiment, a database index build determiner (e.g., 301 in FIG. 3) determines whether the building of a database index has been initiated. In one embodiment, data that indicates whether the building of a database index has been initiated can be retrieved by the database index build determiner (e.g., 301 in FIG. 3) from a database management system (e.g., 207 in FIG. 2A). In another embodiment, data that indicates whether the building of a database index has been initiated can be received by the database index build determiner (e.g., 301 in FIG. 3) from a database management system (e.g., 207 in FIG. 2A).

At step 403, it is determined whether the size of a sub-range of the index exceeds a predetermined size. In one embodiment, a sub-range size determiner (e.g., 303 in FIG. 3) determines whether the size of the sub-range exceeds a predetermined size. At build time the size of sub-ranges of the index to be built are readily ascertainable. In one embodiment, data that provides an indication of the size of the sub-range can be retrieved by the sub-range size determiner from a database management system (e.g., 207 in FIG. 2A). In another embodiment, data that provides an indication of the size of the sub-range can be received by the sub-range size determiner from a database management system (e.g., 207 in FIG. 2A).

At step 405, a block of data storage space is pre-allocated in a data storage file to accommodate subsequent inserts of data into the sub-range. In one embodiment, a sub-range storage space pre-allocator (e.g., 305 in FIG. 3) pre-allocates a block of data storage space in a data storage file to accommodate inserts of data into a sub-range made subsequent to the initial allocation of data storage space for the sub-range from the data storage file. In one embodiment, the sub-range storage space pre-allocator can be prompted to pre-allocate the block of data storage space if a sub-range size determiner (e.g., in 303 FIG. 3) determines that the sub-range size exceeds a predetermined value. And, at step 407, subsequently inserted data is stored in the pre-allocated data storage space.

Exemplary Hardware According to One Embodiment

Figure 5:
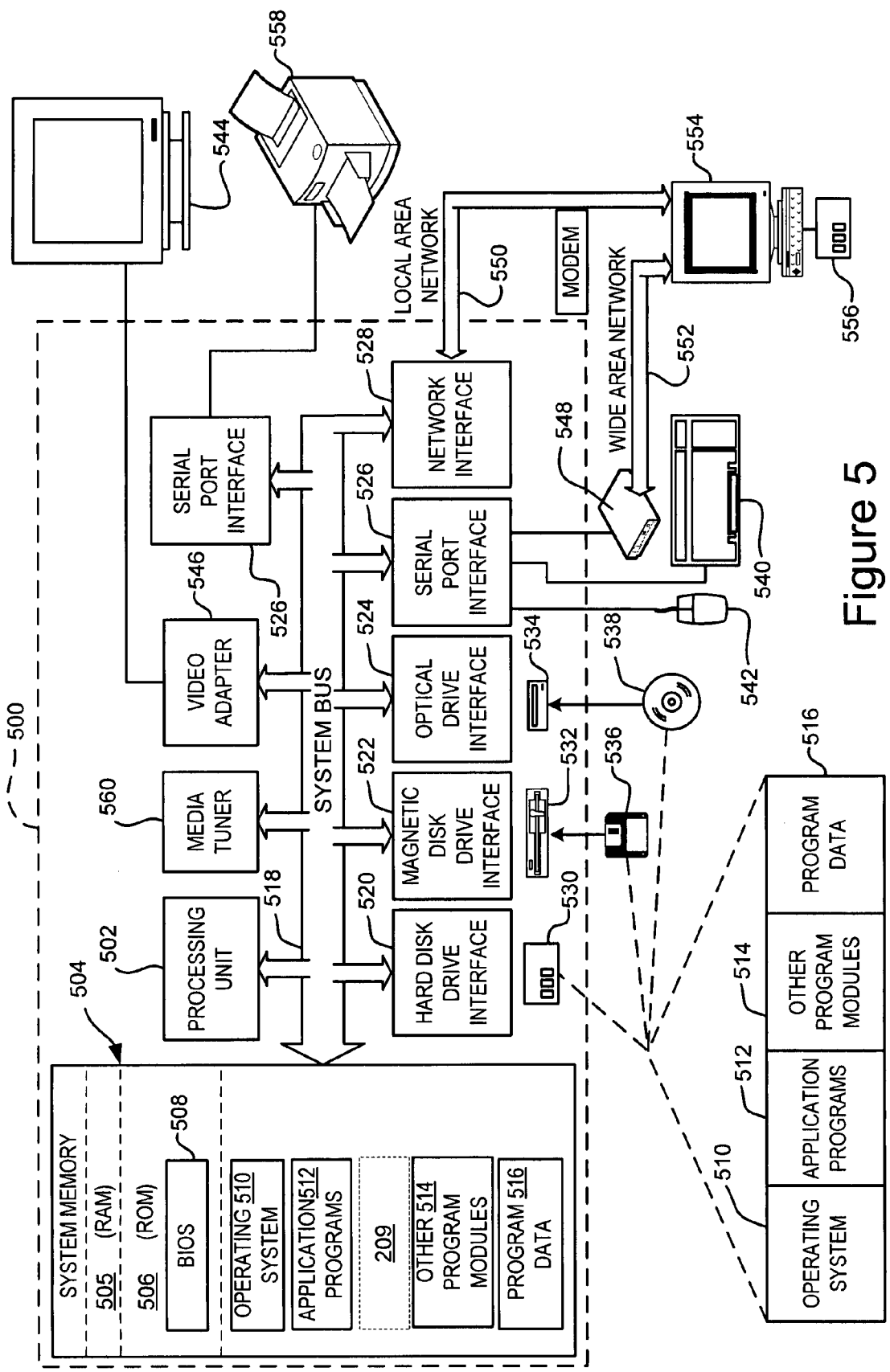
FIG. 5 shows an exemplary hardware operating environment according to one embodiment.

FIG. 5 shows an exemplary hardware operating environment according to one embodiment. As discussed with reference to FIG. 2A, network server 203 and client computer systems 201*a*-201*n* can comprise computing devices. Moreover, a computing device as disclosed herein can encompass a computer 500 that includes a processing unit 502, a system memory 504 and a system bus 518 that operatively couples various system components including the system memory 504 to the processing unit 502. In one embodiment, there can be one or more processing units (e.g., 502), such that processing unit 502 can comprise a single central processing unit (CPU), or a plurality of processing units (e.g., a parallel processing environment). In one embodiment, computer 500 may be a conventional computer, a distributed computer, or any other type of computer.

The system bus 518 can be any of several types of bus structures including a memory bus or memory controller, a peripheral bus, a switched fabric, point-to-point connections, and a local bus using any of a variety of bus architectures. The system memory 504 can include read only memory (ROM) 506 and random access memory (RAM) 505. A basic input/output system (BIOS) 508, containing the basic routines that help to transfer information between elements within the computer 500, such as during start-up, can be stored in ROM 506. The computer 500 can further include a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM, DVD, or other optical media.

As shown in FIG. 5, the hard disk drive 530, magnetic disk drive 532, and optical disk drive 534 can be connected to the system bus 518 by a hard disk drive interface 520, a magnetic disk drive interface 522, and an optical disk drive interface 524, respectively. In one embodiment, the drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 5.

A number of program modules can be stored on hard disk 530, magnetic disk 532, optical disk 534, ROM 506, or RAM 505, including an operating system 510, one or more application programs 512, (e.g., a multimedia software package, database management system 207 and system 209 in FIG. 2A etc., see FIG. 5) other program modules 514, (e.g., a visualization engine, an audio/video decoder, a UI generator and a metadata decoder) and program data 516 (e.g., media content). Moreover, a user can enter commands and information into the computer 500 through input devices such as a keyboard 540 and a pointing device 542 (e.g., a mouse). Other input devices (not shown) can include but are not limited to a microphone, a joystick, a game pad, a tablet, a touch screen device, a satellite dish, a scanner, a facsimile machine, and a video camera. These and other input devices are often connected to processing unit 502 through a serial port interface 526 that is coupled to system bus 518, but can be connected by other interfaces, such as a parallel port, a game port, or a universal serial bus (USB).

A monitor 544 or other type of display device can also be connected to system bus 518 via an interface, such as a video adapter 546. In addition to monitor 544, computers typically include other peripheral output devices, such as a printer (e.g., 558) and speakers (not shown). These and other output devices can be connected to processing unit 502 through a serial port interface 526 that is coupled to system bus 518, but can be connected by other interfaces, such as parallel port, game port, or universal serial bus (USB). In the case of a media server, a tuner 560 can also be connected with system bus 518 in order to receive and convert analog content signals into digital format and similarly convert digital content into analog signals for transmission to connected devices.

Computer 500 can operate in a networked environment using logical connections to one or more remote computers, such as remote computer 554. These logical connections can be achieved by means of a communication device that can be coupled to or integral with computer 500. It should be appreciated that the invention is not limited to a particular type of communications device. Remote computer 554 can be another computer, a server, a router, a network personal computer, a client, a peer device, or other common network node, and can include many or all of the elements described above relative to computer 500, although only a memory storage device 556 is illustrated in FIG. 5. It should be appreciated that the logical connections depicted in FIG. 5 can include a wired or wireless local-area network (LAN) 550, for example, an Ethernet network, or a WiFi network, and a wide-area network (WAN) 552, for example, a cable network or a telephony network. Such networking environments are commonplace in office networks, enterprise-wide computer networks, intranets and the Internet, which are all types of networks.

In one embodiment, when employed in a LAN 550 environment, computer 500 can be connected to local network 550 through a network interface or adapter 528, which is a type of communications device. Moreover, when employed in a WAN 552 environment, computer 500 can include a modem 548, a network adapter, or any other type of communications device for establishing communications over the wide area network 552. The modem 548, which can be internal or external, can be connected to the system bus 518 via the serial port interface 526. In a networked environment, program modules depicted relative to the personal computer 500, or portions thereof, can be stored in a remote memory storage device. It is appreciated that the network connections shown are exemplary and other means of establishing a communications link between the computers can be used.

With reference to exemplary embodiments thereof, reducing database fragmentation is disclosed. One embodiment includes determining whether the building of an index of data that is to be stored in a database has been initiated and determining whether the size of a sub-range of the index exceeds a predetermined size. A block of data storage space is pre-allocated contiguous to a block of data storage space allocated for the sub-range to accommodate subsequent inserts of data into the sub-range, if it is determined that the sub-range exceeds the predetermined size.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method for reducing database fragmentation, comprising:
    initiating an initial build of an index of data to be stored in physical data storage space, the index including a plurality of sub-ranges wherein each sub-range comprises a set of logically contiguous data pages to be stored in the physical data storage space;
    determining a size of a sub-range of the index to be built;
    initially allocating a block of physical data storage space for the sub-range to accommodate the set of logically contiguous data pages of the sub-range in physically contiguous data storage space;
    determining whether the size of the sub-range of the index exceeds a predetermined size; and
    pre-allocating a block of physical data storage space that is contiguous to the block of physical data storage space initially allocated for the sub-range to accommodate only subsequent inserts of data pages that are logically contiguous to data pages of the sub-range, if the size of the sub-range exceeds the predetermined size.

2. The method of claim 1, wherein the block of physical data storage space initially allocated for the sub-range comprises a set of physically contiguous data storage pages.

3. The method of claim 1, wherein the block of physical data storage space pre-allocated for subsequent inserts of data pages comprises a set of physically contiguous data storage pages.

4. The method of claim 1 further comprising:
    storing a subsequently inserted data page that is logically contiguous to the sub-range in a first physical data storage page in the block of physical data storage space pre-allocated for subsequent inserts of data pages.

5. The method of claim 1 further comprising:
    allocating another block of physical data storage space when the block of physical data storage space pre-allocated for subsequent inserts of data pages has been filled.

6. The method of claim 1, wherein subsequent inserts of data pages that are logically contiguous to data pages of the sub-range are appended to the sub-range.

7. The method of claim 1 further comprising:
    accessing information from a database management system.

8. The method of claim 1 wherein the index comprises internal and leaf levels of an index tree.

9. A computer useable medium having computer-executable instructions stored thereon that, when executed, cause a computing device to perform a method comprising:
    initiating an initial build of an index of data to be stored in physical data storage space, the index including a plurality of sub-ranges wherein each sub-range comprises a set of logically contiguous data pages to be stored in the physical data storage space;

determining a size of a sub-range of the index to be built;

initially allocating a block of physical data storage space for the sub-range to accommodate the set of logically contiguous data pages of the sub-range in physically contiguous data storage space;

determining whether the size of the sub-range of the index exceeds a predetermined size; and pre-allocating a block of physical data storage space that is contiguous to the block of physical data storage space initially allocated for the sub-range to accommodate only subsequent inserts of data pages that are logically contiguous to data pages of the sub-range, if the size of the sub-range exceeds the predetermined size.

10. The medium of claim 9, wherein the block of physical data storage space initially allocated for the sub-range comprises a set of physically contiguous data storage pages.

11. The medium of claim 9, wherein the block of physical data storage space pre-allocated for subsequent inserts of data pages comprises a set of physically contiguous data storage pages.

12. The medium of claim 9 further comprising computer-executable instructions for:

storing a subsequently inserted data page that is logically contiguous to the sub-range in a first physical storage page in the block of physical data storage space pre-allocated for subsequent inserts of data pages.

13. The medium of claim 9 further comprising computer-executable instructions for:

allocating another block of physical data storage space when the block of physical data storage space pre-allocated for subsequent inserts of data pages has been filled.

14. The medium of claim 9, wherein subsequent inserts of data pages that are logically contiguous to data pages of the sub-range are appended to the sub-range.

15. The medium of claim 9 further comprising computer-executable instructions for:

accessing information from a database management system.

16. The medium of claim 9, wherein the index comprises internal and leaf levels of an index tree.

17. An apparatus comprising:

a computer readable memory unit; and a processor coupled to said memory unit, said processor for:

initiating an initial build of an index of data to be stored in physical data storage space, the index including a plurality of sub-ranges wherein each sub-range comprises a set of logically contiguous data pages to be stored in the physical data storage space;

determining a size of a sub-range of the index to be built;

initially allocating a block of physical data storage space for the sub-range to accommodate the set of logically contiguous data pages of the sub-range in physically contiguous data storage space;

determining whether the size of the sub-range of the index exceeds a predetermined size; and pre-allocating a block of physical data storage space that is contiguous to the block of physical data storage space initially allocated for the sub-range to accommodate only subsequent inserts of data pages that are logically contiguous to data pages of the sub-range, if the size of the sub-range exceeds the predetermined size.

18. The apparatus of claim 17, wherein the block of physical data storage space initially allocated for the sub-range comprises a set of physically contiguous data storage pages.

19. The apparatus of claim 17, wherein the block of physical data storage space pre-allocated for subsequent inserts of data pages comprises a set of physically contiguous data storage pages.

20. The apparatus of claim 17, wherein the processor stores a subsequently inserted data page that is logically contiguous to the sub-range in a first physical data storage page in the block of physical data storage space pre-allocated for subsequent inserts of data pages.

* * * * *